UNITED STATES PATENT OFFICE.

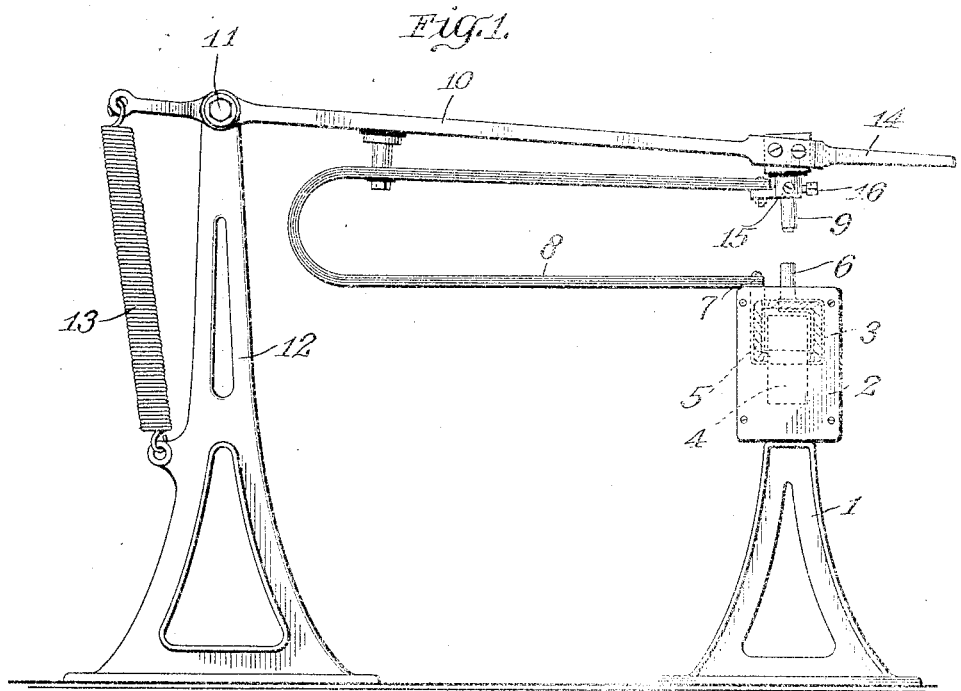

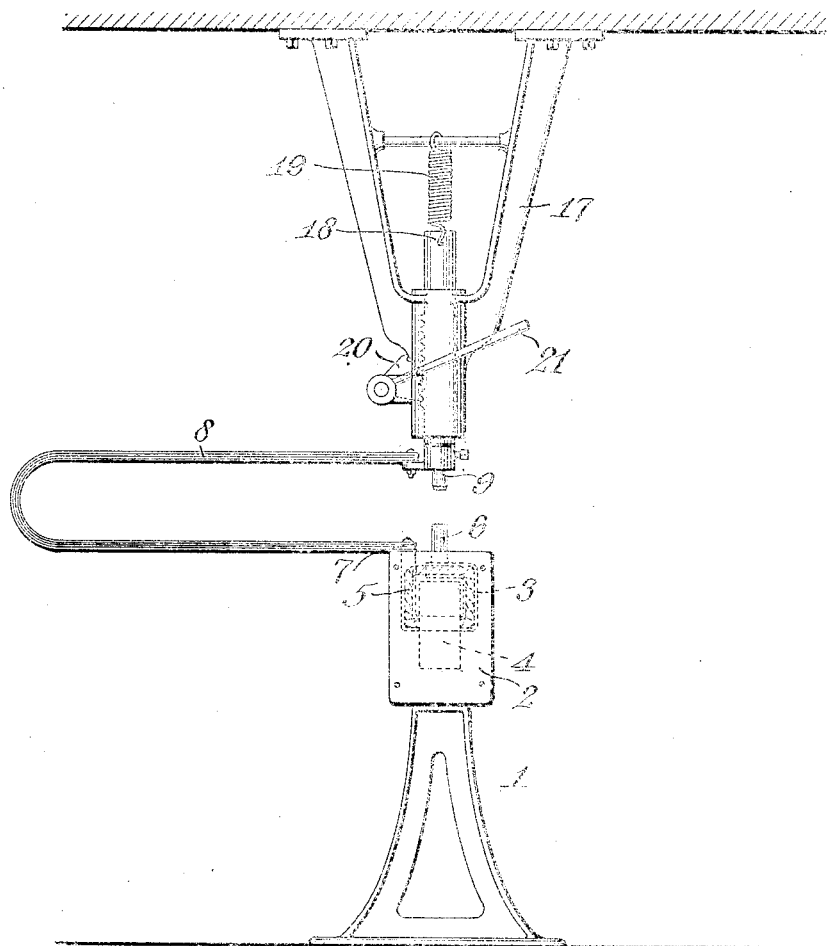

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

SPOT-WELDING MACHINE.

1,084,673.

Specification of Letters Patent.

Patented Jan. 20, 1914.

Application filed May 10, 1912. Serial No. 766,730.

*To all whom it may concern:*

Be it known that I, ELIHU THOMSON, a citizen of the United States, and a resident of Swampscott, in the county of Essex and State of Massachusetts, have invented certain new and useful Improvements in Spot-Welding Machines, of which the following is a specification.

My invention relates to that class of electric welding machines known as spot welders. In this class of machines as ordinarily constructed the spot welding electrodes, by which the welding pressure is applied at the point of the work where the weld is to be formed between the plates or sheets of metal, are mounted on the end of rigid arms extended from the base or pedestal which carries the transformer, the space or opening between said arms forming the throat or opening to accommodate the work and permit a weld to be readily made at any desired point on the same. This form of machine makes it necessary to employ a heavy construction, the expense of which is one of the objects of my invention to avoid.

In my improved construction the welding electrodes are carried or supported in line with the transformer, the latter being mounted in the usual or any desired manner upon the pedestal or other suitable portion of the machine. One terminal of the transformer is projected directly upward as one of the welding electrodes fixed in position though it may be made to telescope up and down for adjustment of height. The other electrode, which may be made to move for the purpose of applying pressure, is mounted above the first substantially in line with the same and the transformer is connected with the opposite pole of the latter so as to form in effect the terminal thereof, by a flexible conductor which extends away from the transformer and pedestal transversely and then back for connection to the upper terminal or electrode, so as to shunt the gap or space corresponding to the throat or opening provided in the previous forms of machine by the rigid arms before referred to. The said shunting conductor may be of any form but is by preference made of strips of copper superposed on one another and properly attached to the rigid terminal of the secondary and to the base or block supporting or carrying the movable electrode. The conductor, however, instead of being made of laminæ may be an ordinary conducting cable or a number of cables running in parallel from the terminal of the transformer to the electrode. For supporting the electrode forming the terminal of this laminated or other construction of conductor shunting the gap any desired construction may be employed. Thus, for instance, it may be supported on the end of a comparatively light pivoted arm carried by a standard or it may be sustained from a ceiling above the machine if the ceiling is not too high and the floor space is valuable.

Figure 1 in the accompanying drawings is a side elevation of a form of machine embodying my invention. Fig. 2 is a plan thereof. Fig. 3 is a side elevation of a modification in the manner of supporting the upper electrode.

1 is a pedestal or support for the welding transformer. Said transformer is preferably closed or boxed in a case, the detachable front plate of which is indicated at 2.

3 indicates in dotted lines the transformer secondary made for convenience and rigidity as a casting, while 4 indicates the usual laminated core of the transformer. The primary may be disposed with relation to the secondary and core in any desired manner but inasmuch as the transformer itself forms no part of my invention the details of construction of the latter are not particularly described herein.

The transformer primary coil is indicated by the numeral 5. The transformer is solidly supported in any proper manner on the pedestal and in such way that pressure may be applied to any desired amount in the welding operation without dislocation of the parts thereof.

6 indicates the lower welding electrode projected upward from one end of the secondary 3 and constructed and attached to its support in any desired manner. The opposite terminal 7 of the secondary extending through the casing or not as desired for convenience of attachment of the cable or conductor referred to has the said cable, conductor or pile of laminæ 8 suitably bolted to it in a manner to form a good joint.

The upper welding electrode 9 which coöperates with electrode 6 is carried by the lever 10 fulcrumed at 11 on a separate column or support 12. The weight of said lever and electrode may be counter-balanced by a suitable weight or spring 13 and said lever may have a forward projection 14 to form a handle for use of the workman in the welding operation. The electrode may be carried and fixed in a socket 15 by means of a set screw 16 to permit adjustment or detachment of the same or may have any other adjustments for alinement or other purposes. The extreme end of the cable or conductor 8 which extends around the gap may be secured to the block or socket 15 by bolting to an ear or projection from the same or may be otherwise electrically connected to the electrode 9, so that the latter will form in effect a terminal of the transformer secondary. The conductor 8 is preferably continuous from point of attachment 7 to point of attachment 15 and is flexible at its bend to permit free movement of the upper electrode in the welding operation.

As will be obvious, the guiding or supporting lever, being required to support only the electrode and the conducting parts, may be of light construction and thin steel may be used for the purpose in place of the heavy castings employed in the previous construction for the arms which project from a pedestal or base and carry at their terminals the welding electrodes.

In the construction shown a pair of levers is employed with braces between to give lateral rigidity.

In the modification of my invention shown in Fig. 3 the movable electrode instead of being carried by the lever sustained at one side of the machine, is mounted in an overhead frame or hanger 17 secured to the ceiling. Said electrode is carried by a plunger or rod 18 guided in said frame and its weight is preferably sustained in part by a spring 19 suitably applied as indicated. Connection is made with the electrode 9 as before by means of the conductor shunting the gap or throat for the work, the two electrodes of the machine being arranged in line with one another and with the transformer and pedestal 1. The electrode may be operated for welding purposes by appliances similar to those used for feeding a drill in an upright drill press and as indicated by the rack on the side of the plunger, which is engaged by the segment 20 carrying the operating handle 21.

It will be seen that electrically the construction is the same as the previous construction of spot welder in which the transformer is located at the base of the throat or opening and rigid arms and connections extend therefrom laterally to the electrodes mounted on the end of said arms. But in my improved construction the electrodes and transformer are substantially in line with one another and the throat or opening for the work is provided by the flexible conductor, the bend of which is the bottom or base of the throat.

It is obvious that the construction permits the ready substitution of cables or conductors of different length or depth of opening or throat to accommodate work of different sizes. With very small work, that is with plates or sheets of small superficial extent, a very short length of cable or conductor may be employed on the same machine by simply detaching the longer conductor at the points of attachment to the transformer terminal 7 and upper electrode and substituting the shorter one with some consequent advantage in the consumption of power.

What I claim as my invention is:—

1. In a spot welding machine, the combination with a transformer of a welding electrode forming one terminal thereof and mounted in line therewith and a conducting extension from the other terminal of the transformer secondary projected laterally and extending back for attachment to the opposite electrode to shunt the gap provided for the work, the support for said opposite electrode being located outside the gap provided by said conducting extension.

2. In an electric welding machine, the combination with a transformer mounted on a suitable pedestal or support and having one terminal of the secondary projected upward as a welding electrode fixed in position, of a second electrode movably supported above the same, a flexible extension from the other electrode or terminal of the transformer led off therefrom in a way to shunt the gap and terminating in and fixed to said movable electrode, and a support for said second electrode located outside the gap provided by said extension.

3. In an electric welding machine, the combination substantially as described with a transformer mounted on a suitable pedestal or support and having one pole or terminal of its secondary terminating in a fixed welding electrode, of a laminated conductor attached to and extending laterally from the opposite pole or terminal of the transformer secondary and back to position over the transformer so as to form the throat or gap for the work and a welding electrode mounted over the transformer and connected to the end of said conductor, the support for said electrode being located outside the gap provided by said laminated conductor.

4. In an electric welding machine, the combination substantially as described of a transformer suitably mounted on a suitable pedestal or support and having a fixed welding electrode as one terminal or pole of the secondary, a second welding electrode mounted over the latter and carried by a frame or support independent of the transformer support or pedestal and a flexible connection from the pole or terminal of the transformer to said movable electrode extending around to form the gap or throat for the work.

5. In an electric welding machine, the combination substantially as described of a transformer suitably mounted on a suitable pedestal or support and having a fixed welding electrode as one terminal or pole of the secondary, a second welding electrode mounted over the latter and carried by a frame or support independent of the transformer support or pedestal and a laminated conductor extending around to form the gap or throat for the work and having its ends fastened respectively to the opposite terminal of the transformer secondary and to the conducting base or block carrying said second electrode.

Signed at Lynn in the county of Essex and State of Massachusetts this 2nd day of May A. D. 1913.

ELIHU THOMSON.

Witnesses:
JOHN A. MCMANUS, Jr.,
HENRY A. ANDERSEN.